Figure 1:
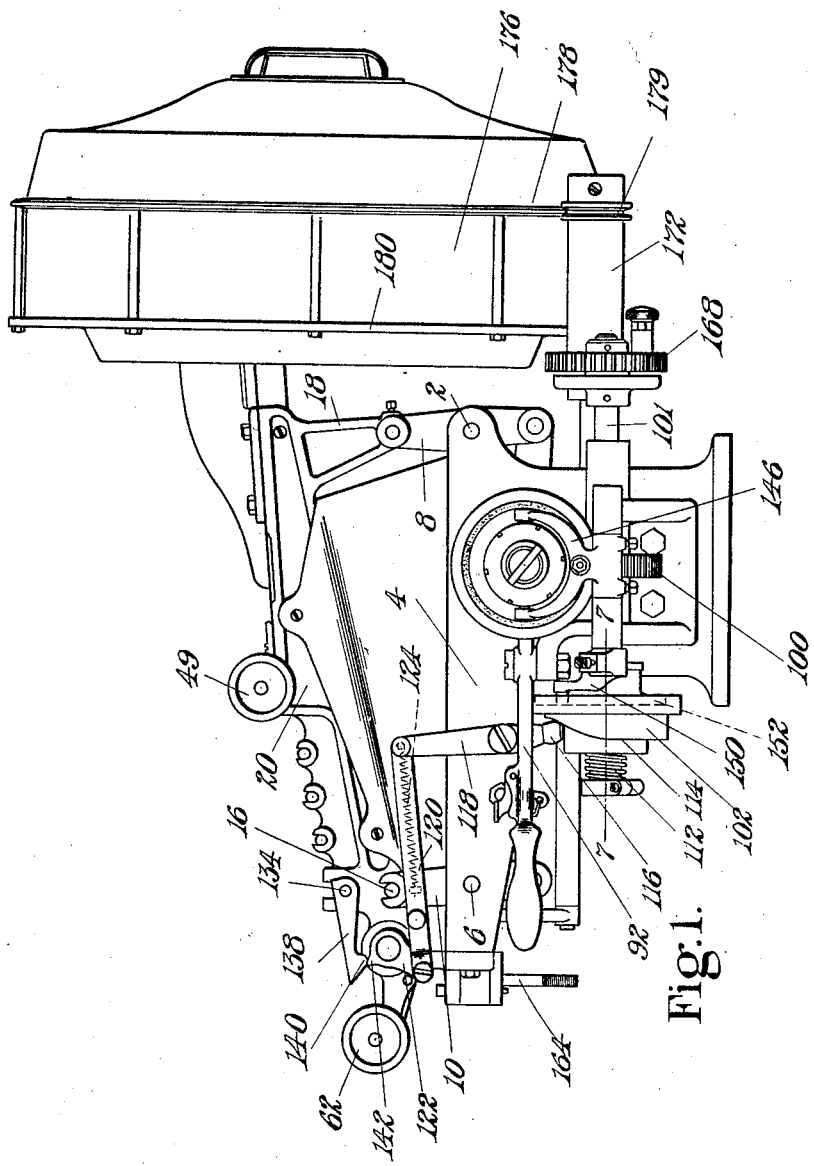

J. H. POPE.
NAIL ASSORTING MACHINE.
APPLICATION FILED FEB. 12, 1908.

1,005,303.

Patented Oct. 10, 1911.
5 SHEETS—SHEET 1.

WITNESSES
Edith C. Holbrook
Elizabeth C. Coupe

INVENTOR
Joseph H. Pope
By his Attorney,
Nelson W. Howard

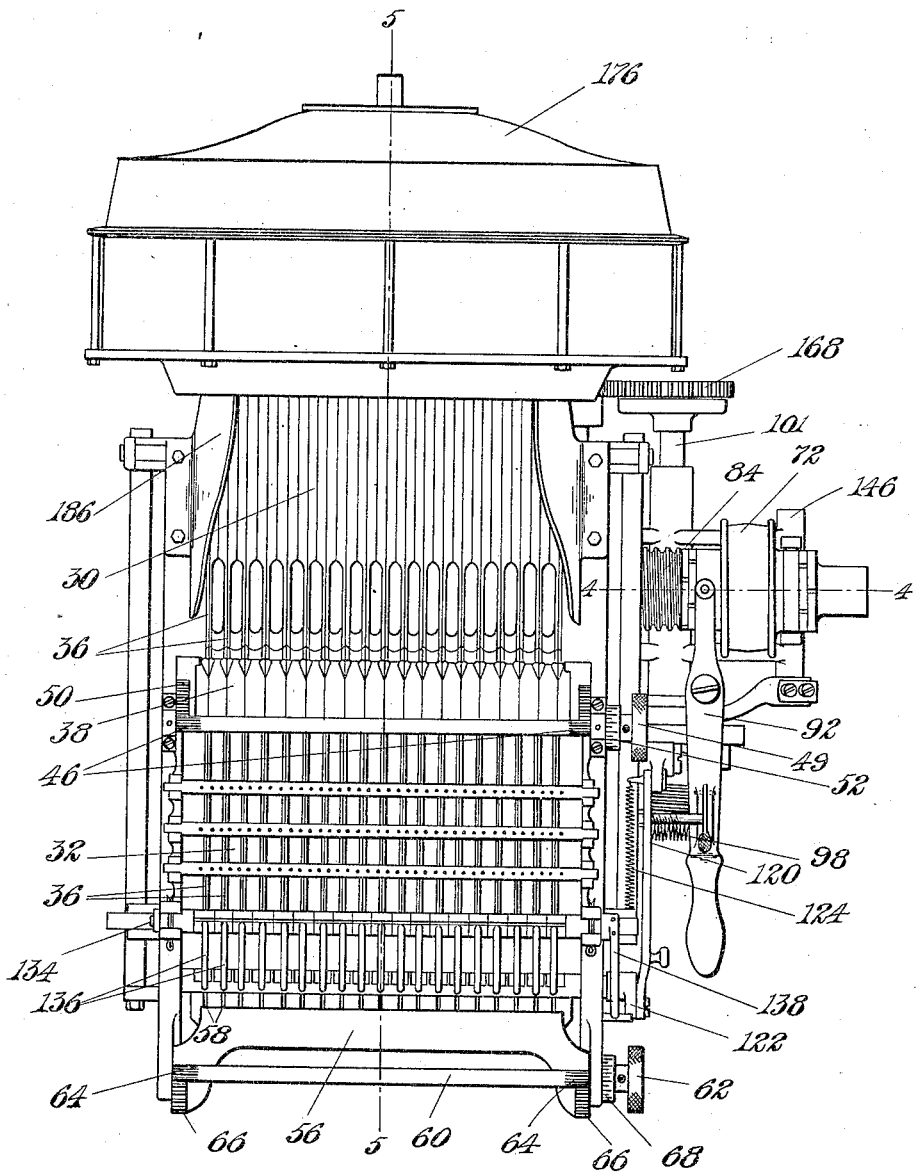

J. H. POPE.
NAIL ASSORTING MACHINE.
APPLICATION FILED FEB. 12, 1908.

1,005,303.

Patented Oct. 10, 1911.

5 SHEETS—SHEET 3.

WITNESSES:
Edith C. Hollbrook
Elizabeth C. Coupe

INVENTOR
Joseph H. Pope
By his Attorney,
Nelson W. Howard

J. H. POPE.
NAIL ASSORTING MACHINE.
APPLICATION FILED FEB. 12, 1908.

1,005,303.

Patented Oct. 10, 1911.
5 SHEETS—SHEET 4.

WITNESSES
Edith C. Hollbrook
Elizabeth C. Coupe

INVENTOR
Joseph H. Pope
By his Attorney
Nelson W. Monard

J. H. POPE.
NAIL ASSORTING MACHINE.
APPLICATION FILED FEB. 12, 1908.

1,005,303.

Patented Oct. 10, 1911.

5 SHEETS—SHEET 5.

WITNESSES
Edith C. Holbrook
Elizabeth C. Coyle

INVENTOR
Joseph H. Pope
By his Attorney,
Nelson W. Howard

UNITED STATES PATENT OFFICE.

JOSEPH H. POPE, OF HAMILTON, MASSACHUSETTS, ASSIGNOR TO UNITED SHOE MACHINERY COMPANY, OF PATERSON, NEW JERSEY, A CORPORATION OF NEW JERSEY.

NAIL-ASSORTING MACHINE.

1,005,303.  Specification of Letters Patent.  Patented Oct. 10, 1911.

Application filed February 12, 1908.  Serial No. 415,628.

*To all whom it may concern:*

Be it known that I, JOSEPH H. POPE, a citizen of the United States, residing at Hamilton, in the county of Essex and Commonwealth of Massachusetts, have invented certain Improvements in Nail-Assorting Machines, of which the following description, in connection with the accompanying drawings, is a specification, like reference characters on the drawings indicating like parts in the several figures.

This invention relates to machines for assorting nails and is intended primarily as an improvement in nail assorting machines adapted to receive nails with their heads and points arranged indiscriminately and deliver them with their heads pointing the same way, and more particularly as an improvement upon the nail assorting machine disclosed in United States Letters Patent to Mayo et al. 707,138, August 19, 1902.

The present invention, as that disclosed in said patent is embodied in a nail assorting machine in which nails arranged indiscriminately are received upon the upper end of an inclined reciprocating raceway and arrive, with their heads pointing one way, at the lower end thereof from which they are delivered by means of a discharging device. The reciprocations of the raceway are suspended during the actuation of the discharging device in order to prevent interference with the operation of said device. A rotary magazine is employed to supply nails to the upper end of the raceway.

The object of the present invention is to provide a nail assorting machine of the type above referred to in which the various parts are constructed and arranged in an improved and simplified manner.

With this object in view the present invention contemplates the provision in a nail assorting machine, having a raceway to receive and guide nails, of an improved mechanism for actuating the discharging device which is adapted to insure a more prompt delivery of the nails from the raceway than has been possible in previous machines.

The invention further contemplates the provision of an improved rotary magazine which is constructed and arranged to evenly distribute nails upon the upper end of the raceway in the operation of the machine and thereby obviate the necessity of employing a separate distributing device between the raceway and the magazine, such as is commonly used in nail assorting machines to insure the even distribution of nails on the raceway. In carrying out this feature of the invention a series of nail-lifting shelves on the inner circumference of the magazine are arranged to discharge nails at different points transversely of the raceway. To this end, in the prefererd embodiment of the invention, nail shelves are arranged in different angular relations to the inner circumference of the magazine, but it will be understood that this effect may be secured in other ways without departing from the present invention.

Another feature of the invention comprises an improved actuating mechanism for the rotary magazine whereby in the operation of the machine its continual rotation is effectually insured.

In addition to the features above mentioned, the machine herein disclosed also embodies certain features of construction and arrangement of parts, the advantages of which will be obvious to those skilled in the art from the following description.

Figure 4:
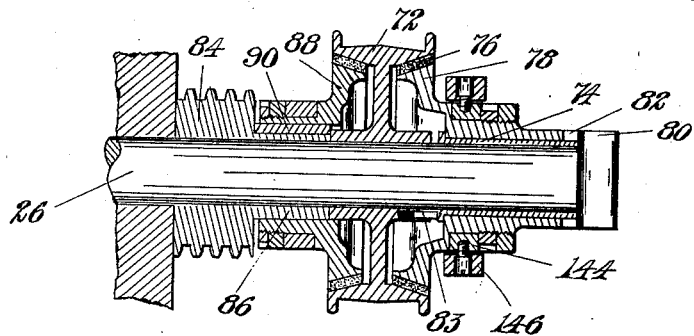
Figure 3:
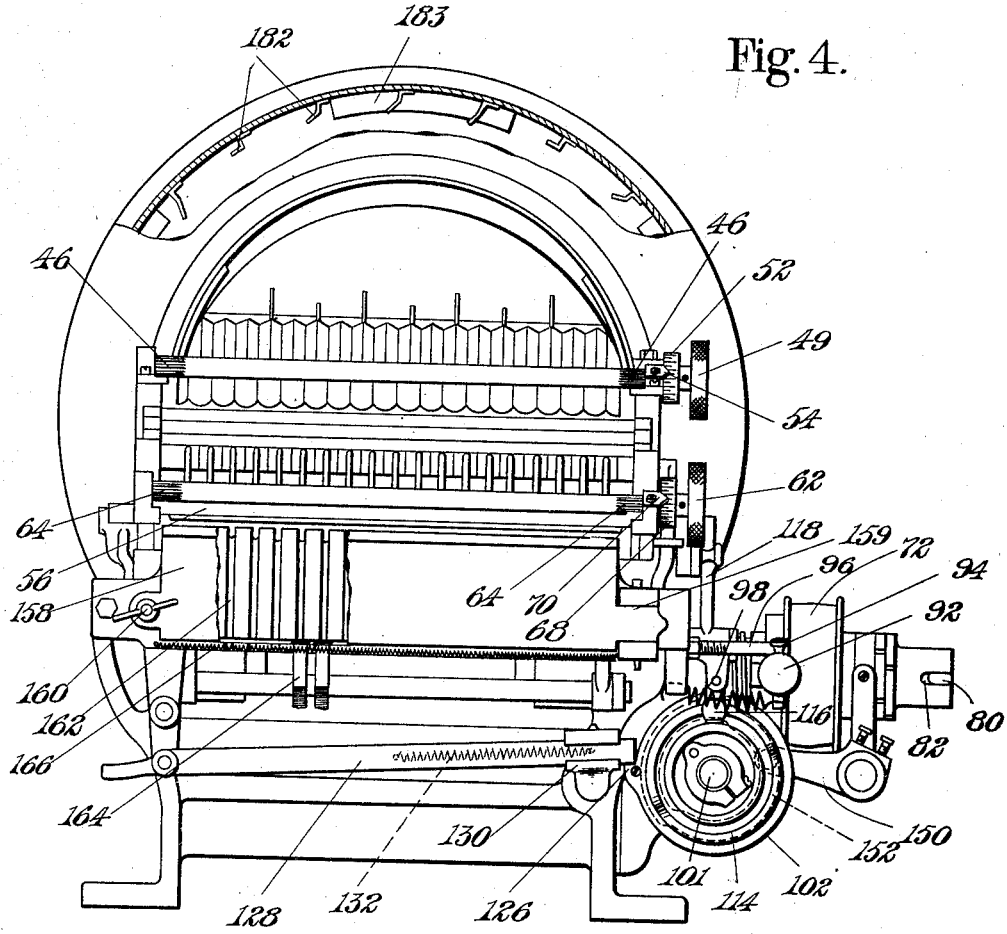
Figure 5:
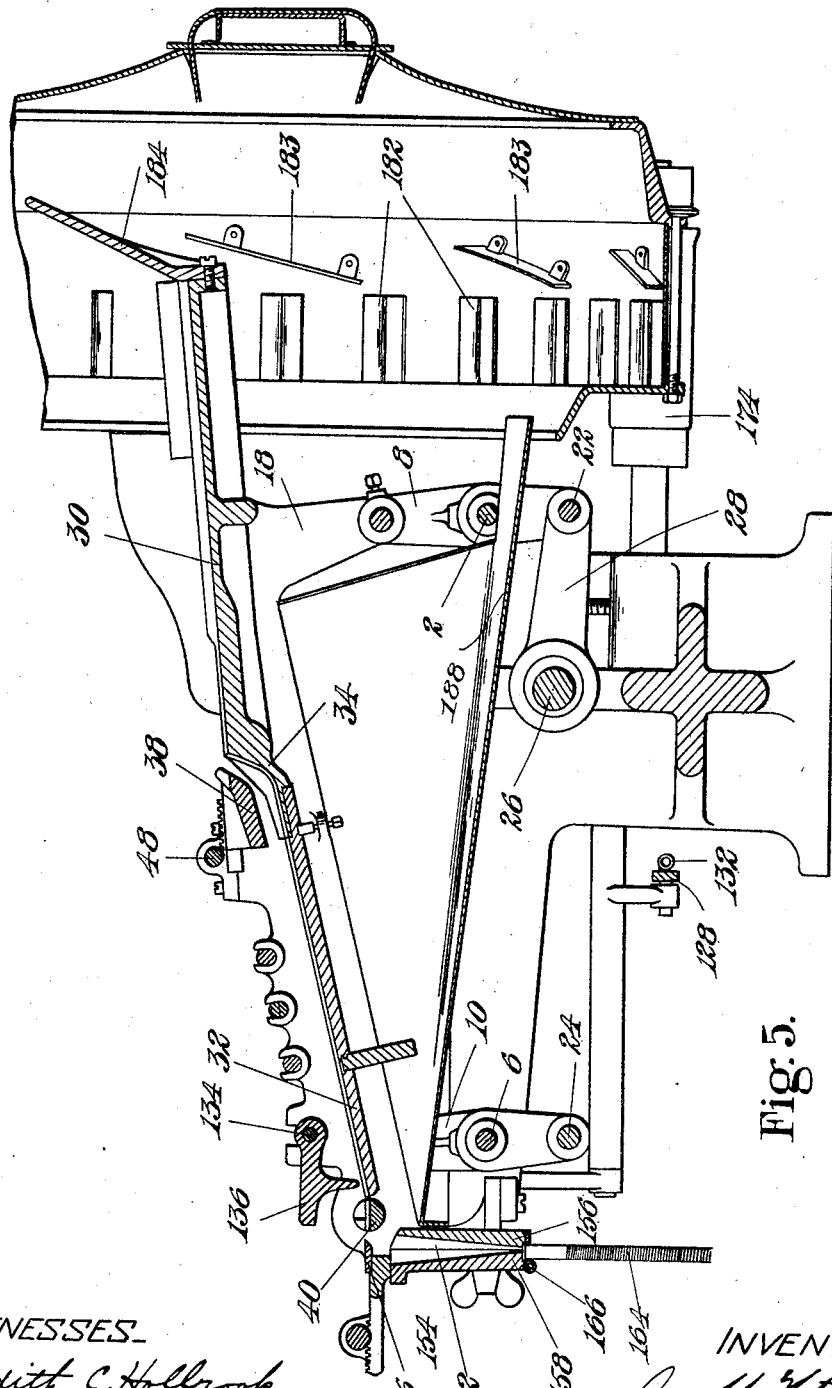
Figure 7:
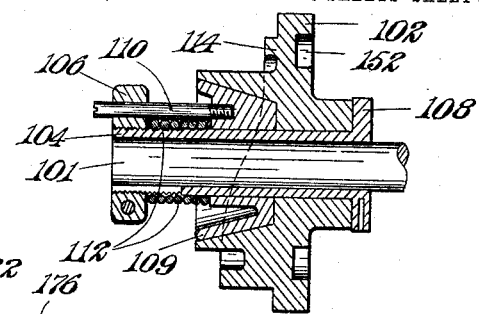
Figure 6:
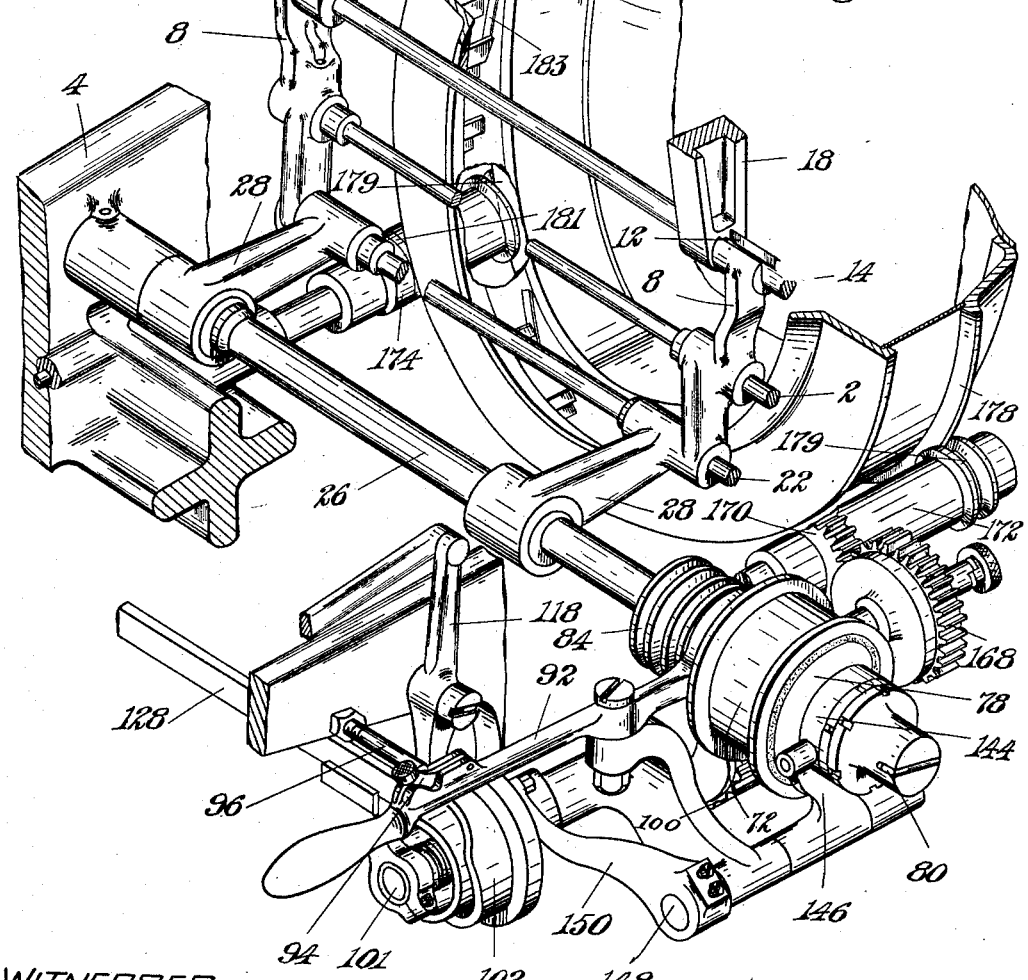

In the drawings,—Figure 1 is a side elevation of a nail assorting machine embodying the present invention; Fig. 2 is a plan view of the machine shown in Fig. 1; Fig. 3 is a front elevation of the nail assorting machine; Fig. 4 is a sectional view taken on the line 4—4 of Fig. 2; Fig. 5 is a central longitudinal section of the nail assorting machine; Fig. 6 is a view in perspective showing the actuating mechanism for the raceway and that for the magazine; Fig. 7 is a detail sectional view taken on the line 7—7 of Fig. 1.

Referring to the drawings a shaft 2 is supported at the rear of the machine in suitable bearings on the main frame 4. A second shaft 6 is supported at the front of the machine in parallel relation with the first shaft. A pair of swinging arms 8 are pivotally mounted intermediate their ends upon the shaft 2 and a second pair of arms 10 are similarly mounted upon the shaft 6. The arms are each provided with transverse grooves 12 in their upper ends. A rod 14 is supported in the grooves in the swinging arms 8 and a second rod 16 is sustained in the grooves in the arms 10 and in parallel relation with the first rod. Two brackets 18 mounted upon the rod 14 serve to support the upper end of an inclined raceway frame 20 and the lower end of said frame is supported by the rod 16. A connecting rod 22 extends between the lower ends of the arms 8 and a second rod 24 serves to connect the arms 10. A main shaft 26 supported in suitable bearings on the frame 4 extends transversely of the machine and a pair of links 28 are eccentrically mounted on this shaft and pivotally connected to the rod 22 in such manner that rotation of said shaft imparts a reciprocating movement to the raceway frame. A raceway adapted to receive nails and deliver them with their heads pointing in the same direction is secured in any suitable manner upon the inclined raceway frame. The raceway comprises an upper section 30, a lower section 32 and an intermediate connecting section 34, each of which is provided with nail receiving grooves 36 arranged longitudinally of the sections in the usual manner. A nail reversing plate 38 extends transversely of the raceway and serves to reverse the nails which descend point first from the upper section of the raceway. The nails are delivered from the lower end of the raceway by a discharging device 40 to a series of nail conduits 42 from which they descend through nail tubes to the nailing machine in which they are to be employed. The construction of the sectional raceway and the discharging device may be substantially the same as disclosed in the patent to B. F. Mayo, 707,138, before mentioned, and accordingly these parts are not described in detail in this application.

The reversing plate 38 may be similar in general construction to that disclosed in the above patent, and is arranged for adjustment longitudinally of the raceway to suit nails of different length. To secure this adjustment two pinions 46 are formed on a transverse shaft 48 which is rotatably mounted upon the frame of the raceway. Each pinion is arranged to engage one of two racks 50 formed on opposite ends of the reversing plate. The shaft 48 is provided with a milled head 49 whereby the operator may conveniently adjust the position of the plate. A circular graduated disk 52 is mounted on the shaft 48 and a finger 54 on the frame of the raceway serves as a reference index for the disk. It will be understood in changing the size of the nails operated upon that the graduations serve to indicate the necessary adjustment for the shaft 48 to suit the new size of nails. A stop plate 56 extending transversely of the lower end of the raceway is provided with notches 58 adapted to receive the leading ends of the nails which come on to the discharging device and is arranged for adjustment to and from the discharging device to accommodate nails of different lengths. The mechanism for adjusting the stop plate comprises a shaft 60 provided with a milled head 62 and two pinions 64 which mesh respectively with two racks 66 on the stop plate. The shaft 60 is provided with a graduated disk 68 which in connection with an index finger 70 on the raceway frame serves to indicate the proper position of the stop plate to suit nails of any given size.

The main shaft 26 carries a loose pulley 72 whose outward movement is limited by a flanged sleeve 74 secured on the outer end of the shaft. The pulley transmits motion to the main shaft by means of a clutch mechanism which comprises an inclined friction surface 76 formed in the outward side of the pulley and a driven member 78 mounted on the sleeve 74 and adapted to frictionally engage said surface. A key 80 secured in the outer end of the main shaft passes through the sleeve and through slots 82 in the driven member to allow the latter to have a limited movement longitudinally of the shaft and to cause the shaft to rotate with said member. A series of spring-pressed pins 83 in the hub of the pulley, one only being shown in Fig. 4 of the drawings, engage the flange on the sleeve 74 and prevent the engagement of the driven member 78 with the pulley while the latter is loosely running on the shaft. A worm 84 loosely mounted on the main shaft and prevented from moving inwardly by the frame of the machine is provided with a tubular extension 86 surrounding the shaft and adapted to engage the inner side of the hub of the pulley 72. A driven member 88 having a conical surface adapted to engage the inner side of the pulley is mounted for limited longitudinal movement on the tubular extension 86, but is restrained from rotary movement thereon by means of a key 90 positioned within a keyway formed between the tubular extension and the inner face of the driven member. A suitable hand lever 92, extending longitudinally of the machine is pivoted intermediate its ends upon a suitable support and arranged to move the driven member 88 into and out of engagement with the pulley. It will be seen in the arrangement disclosed that when the driven member 88 is moved into engagement with the inner side of the pulley that the outer side of the pulley is forced into engagement with the driven member 78 and that when the driven member 88 is moved into operative position the spring-pressed pins 83 will move the pulley out of engagement with the driven member 78. A spring-pressed member 94 upon the hand lever is adapted to engage the end face of a stop pin 96 and lock the lever in its outer position in which the driven member 88 is free from engagement with the pulley. A spring 98 extending between the front of the lever and the frame of the machine serves to hold the lever in its inner position during the operation of the machine. The worm 84 meshes with a gear 100 secured on an auxiliary shaft 101 which is arranged transversely of the main shaft in suitable bearings.

A disk 102 is rotatably mounted on a sleeve 104 which is clamped on the forward end of the auxiliary shaft by means of a split collar 106 arranged for adjustment longitudinally of the shaft upon said sleeve. The sleeve 104 is provided with an annular flange 108 adapted to prevent rearward movement of the disk. The disk 102 is arranged to be frictionally driven from the shaft and to this end a conical plug 109, loosely mounted upon the sleeve, is arranged for rotation with the shaft by means of a pin 110 which projects forwardly from the plug and through an opening in the collar. The conical plug is held in constant engagement with a friction surface formed in the front side of the disk by means of a compression spring 112 which extends between said plug and the collar. The disk 102 is arranged to actuate the discharging device and, according to a convenient construction, a cam surface 114 formed on the front side of the disk engages a cam roller 116 mounted on the lower end of a lever 118 which is pivoted intermediate its ends on the frame of the machine. The upper end of the lever 118 is connected by a link 120 to a crank 122 secured on the end of the discharging device. A spring 124 is arranged to hold the cam roller in engagement with the cam surface on the disk. The cam disk is rotated only at such time as the nails on the discharging device are to be delivered to the nail conduits, and accordingly the disk 102, which continually tends to rotate under the influence of the conical plug 109, is normally restrained from rotary movement and arranged to be released when it is desired to effect the discharge of nails. It will be understood that the tension of the spring 112 is adjusted so that only sufficient frictional force is transmitted to the disk 102 to suitably actuate it, which arrangement reduces to a minimum the friction between the conical plug and the disk while the latter is held stationary. To normally prevent the rotation of the disk a stop projection 126 is formed upon the periphery of the disk and a stop lever 128, slidably mounted in a guideway 130, is held in the path of the stop projection by means of a suitable spring 132. The stop lever may of course be retracted through any suitable means. It will be seen that as the conical plug is in continual frictional engagement with the disk that the latter will start immediately upon its release to effect the actuation of the discharging device, thus insuring a more prompt delivery of the nails from the lower end of the raceway than would be the case if a clutch mechanism which required an interval of time for its operation was employed to transmit motion to the disk.

A rock-shaft 134 mounted transversely of the lower section of the raceway in suitable bearings on the frame thereof carries a series of nail stops 136, one being provided for each groove in the raceway. The stops are normally upheld but when a series of nails are to be delivered from the discharging device the rock-shaft is allowed to turn so that the stops descend by their own weight and rest upon the next series, thus detaining the remaining nails on the raceway while the first series is being delivered. To hold the stops in their upward position, an arm 138 is secured on the end of the rock-shaft and its free end is provided with a rounded surface 140 adapted to rest upon a cam surface 142 on the crank 122. As shown in Fig. 1, the cam surface is so formed that when the crank is turned to operate the discharging device the stops are allowed to descend and when said device is returned to its normal position the stops are raised.

It is customary in nail assorting machines to suspend the reciprocations of the raceway while a series of nails are being delivered therefrom. Accordingly in the machine herein disclosed the driven member 78 on the main shaft carries in a peripheral groove a collar 144 which is suitably connected on opposite sides with the two ends of a bifurcated arm 146 secured on a rock-shaft 148 which is mounted below and transversely of the main shaft in suitable bearings. An arm 150 has one end secured on the rock-shaft and its other end carries a roller which is arranged to work in a cam slot 152 formed in the rear side of the disk 102. The cam slot is so arranged that the driven member 78 is normally held in engagement with the driving pulley on the main shaft and is only moved from engagement therewith when the nail discharging device is operated to deliver nails from the raceway.

There is provided below the discharging device and substantially parallel therewith a bar 154 in which are formed the nail conduits 42 before mentioned, adapted to receive the nails delivered from the raceway. According to a convenient construction, the bar comprises a stationary section 156 secured to the frame of the machine, and a movable section 158 pivotally mounted at 159 upon the stationary section. A suitable locking device 160 is employed for securing the sections together. A series of grooves 162 in the meeting faces of the sections coöperate in forming the nail conduits and a series of nail tubes 164 are clamped between the sections in the lower parts of said conduits. As shown in Fig. 5, the nail tubes are provided at their upper ends with flanges which extend into suitable recesses in the stationary section and thus prevent downward displacement of the nail tubes. In the arrangement disclosed it will be seen that upon swinging the movable section outwardly a nail tube which has become clogged with nails may be easily removed. The nail tube may then be freed from obstructing nails and replaced in the machine. In order to prevent the entire series of nail tubes from falling out with a single tube is being removed, a coiled spring 166 is positioned longitudinally of the row of nail tubes and arranged to hold the tubes in yielding engagement with the stationary member.

The auxiliary shaft 101 is provided at its rear end with a pinion 168 which meshes with a pinion 170 fast upon a rotary magazine driving roller 172 which is mounted longitudinally of the machine at one side of the magazine hereinafter described. A freely rotatable magazine supporting roller 174 is mounted parallel with the first roller upon the opposite side of the magazine. A circular magazine 176 is supported upon the two rollers and arranged to be rotated by the roller 172. The magazine is provided with a peripheral driving flange 178 which is received in grooves formed respectively in the two rollers. The groove in the driving roller 172 is outwardly flaring in order that the sides of the driving flange may be held by the weight of the magazine in firm frictional engagement with the sides of said groove. There is also provided a second peripheral flange 180 which is received in a groove 181 formed in the supporting roller 174, but is free from contact with the driving roller.

The rotary magazine used in connection with the nail assorting machine is commonly made in part of sheet metal, and where it is subjected to rough usage there is, of course, considerable liability of its becoming distorted. In previous machines where the driving roller has engaged the magazine at points other than its driving flange there has been in the operation of the machine a liability of such distortion causing the driving flange to be lifted out of engagement with the groove in the driving roller whereupon the rotation of the magazine has frequently stopped, as under such conditions there is generally not sufficient friction produced between the roller and magazine to effect the rotation of the latter. Accordingly in the machine herein disclosed the driving roller 172 engages the driving flange on the magazine and is free from contact with the remaining portion of the magazine. It will be seen with this arrangement that liability of the driving flange being lifted out of engagement with the driving roller in the manner above described is effectually prevented and thereby the continuous rotation of the magazine is insured during the operation of the machine.

The magazine has a central opening in its inner face into which extends the upper section of the raceway. A series of nail lifting shelves 182 on the inner surface of the magazine serve to carry the nails upwardly and distribute them on the raceway. In order that different nail shelves shall allow the nails to fall at different points on the raceway and thus insure the even distribution of the nails thereon, the nail shelves are arranged in different angular relations with the inner surface of the magazine, as shown in Fig. 3. The nail shelves do not extend entirely across the inner surface of the magazine and in the rear of the shelves are a plurality of diagonally arranged feeders 183 which serve to work the nails toward the front of the magazine where they will be engaged by said shelves. A retaining member 184 secured on the upper end of the raceway projects upwardly and rearwardly into the magazine and serves to prevent the nails which fall on the raceway from being deflected back into the magazine, and a pair of side flanges 186 prevent lateral deflection of the nails from the upper end of the raceway. The nails which fail to become properly lodged in the grooves in the raceway and which, therefore, fall through the usual openings in the upper section of the raceway are returned to the magazine by a returning table 188 which is firmly secured to the frame of the raceway.

Preliminary to the starting of the machine the nail reversing plate and the stop plate are adjusted in the manner previously indicated to accommodate nails of the desired size and the magazine is supplied with nails. To start the machine the hand lever 92 is unlatched and moves inwardly, whereupon the main shaft and the auxiliary shaft commence to rotate which causes the raceway to reciprocate and the magazine to rotate. The rotation of the magazine causes the nail shelves to lift nails and distribute them on the upper end of the reciprocating raceway. Inasmuch as nail shelves are arranged in different angular relations with the inner surface of the magazine, the nails are allowed to fall at different points upon the raceway, thus insuring an even distribution of the nails thereon. Nails which become properly lodged in the grooves on the upper section of the raceway arrive at the lower section thereof with their heads pointing in one direction, as in the patent No. 707,138 before mentioned.

Normally the discharging device 40 and the stops 136 are positioned as shown in Fig. 5, so that the nails are free to slide down the raceway until the first series of nails enter the grooves in the discharging device and are arrested by striking the stop plate 56. The nails on the discharging device are discharged only at such time as it is desired to deliver a series of nails to the nailing machine which is to be supplied by the nail assorting machine. When the stop lever 128 is retracted to effect this purpose, the disk 102 is allowed to rotate through one revolution under the influence of the conical plug 109. Upon the initial movement of the disk the driven member 78 is moved from engagement with the driving pulley which causes the reciprocations of the raceway to be suspended. At the same time the stops 136 are allowed to descend upon the next series of nails and the discharging device is actuated to deliver the first series of nails to the nail conduits, from which they descend through the nail tubes 164 to the nailing machine. In the further movement of the disk 102 the discharging device and stops 136 are returned to their normal positions and the driven member 78 is moved into engagement with the pulley which causes the raceway to be again reciprocated. With the discharging device, stops and driven member 78 in these positions, the stop projection 126 again engages the stop lever 128 which has been returned to its normal position by the spring 132 and the rotation of the disk is stopped, leaving the parts of the machine in position to repeat the above operation whenever the stop lever is again retracted.

Having described my invention, what I claim as new and desire to secure by Letters Patent of the United States is:—

1. In a nail assorting machine, a raceway to receive and assort nails, a device for delivering nails from the raceway, a continuously rotating driving member, mechanism for actuating said nail delivering device, said mechanism being frictionally driven from said driving member, and releasable means for positively preventing operation of said actuating mechanism and maintaining said delivering device in a predetermined position.

2. In a nail assorting machine, a rotary magazine provided with a peripheral driving flange, a driving roller and an auxiliary roller arranged to sustain the magazine revolubly between them, said driving roller being provided with an outwardly flaring peripheral groove formed to receive the flange of the magazine with said flange in engagement with the sides of the groove, said magazine being free from contact with the remaining portion of said driving roller.

3. In a nail assorting machine, a power-driven member arranged for continuous rotation, a raceway to receive and assort nails, a rotary magazine for supplying nails to the raceway, mechanism for transmitting reciprocating motion from said member to the raceway, mechanism for transmitting rotary motion from said member to the magazine, and means for simultaneously connecting or disconnecting said mechanisms with the power-driven member, including engaging devices arranged on opposite sides of said member.

4. In a nail assorting machine a rotary magazine provided on its inner surface with a series of nail lifting shelves arranged in different angular relations with said surface for the purpose described.

5. In a nail assorting machine a bar formed in two separable longitudinal sections having grooves in their meeting faces arranged to form a series of vertical nail conduits, a series of nail tubes clamped in the conduits between said sections and a coil spring extending longitudinally of said bar and arranged to yieldingly hold the tubes in engagement with the grooves in one of the sections.

6. In a nail assorting machine, a driving member arranged for continuous rotation, a raceway to receive and assort nails, a rotary magazine for supplying nails to the raceway, a discharging device for delivering nails from the raceway, mechanism for transmitting reciprocating motion to the raceway, mechanism for transmitting rotary motion to the magazine, means for simultaneously throwing said mechanisms into and out of operative relation to the driving member, including engaging devices arranged on opposite sides of said member and automatic means for throwing the reciprocating mechanism for the raceway out of operative relation to said driving member during the actuation of the discharging device.

7. In a nail assorting machine, a shaft, a driving member loosely mounted thereon, a raceway to receive and assort nails, arranged to be reciprocated by the rotation of the shaft, a rotary magazine for supplying nails to the raceway, mechanism for transmitting rotary motion to the shaft comprising a clutch member connected for rotation with said shaft and formed for engagement with a side of the driving member, mechanism for transmitting rotary motion to the magazine, including a clutch member interconnected for rotary movement with said magazine and arranged for engagement with the opposite side of the driving member, the arrangement being such that upon moving said last-named clutch member into operative engagement with said driving member the latter is forced into operative engagement with said first-named clutch member.

8. In a nail assorting machine, a shaft, a driving member loosely mounted thereon, a raceway to receive and assort nails arranged to be reciprocated by rotation of the shaft, a rotary magazine for supplying nails to the raceway, a discharging device for delivering nails from the raceway, mechanism for transmitting rotary motion to the shaft comprising a clutch member connected for rotation with said shaft and formed for engagement with a side of the driving member, mechanism for transmitting rotary motion to the magazine including a clutch member interconnected for rotary movement with said magazine and arranged for engagement with the opposite side of the driving member, said clutch members being arranged for simultaneous engagement with said driving member, and automatic means for throwing the reciprocating mechanism for the raceway out of operative relation to said driving member during the actuation of the discharging device.

In testimony whereof I have signed my name to this specification in the presence of two subscribing witnesses.

JOSEPH H. POPE.

Witnesses:
BERNARD BARROWS,
ALLAN H. BARROWS.

Copies of this patent may be obtained for five cents each, by addressing the "Commissioner of Patents, Washington, D. C."

It is hereby certified that in Letters Patent No. 1,005,303, granted October 10, 1911, upon the application of Joseph H. Pope, of Hamilton, Massachusetts, for an improvement in "Nail-Assorting Machines," errors appear in the printed specification requiring correction as follows: Page 2, lines 122–123, for the word "operative" read *inoperative*; page 4, line 12, for the word "with" read *while*; and that the said Letters Patent should be read with these corrections therein that the same may conform to the record of the case in the Patent Office.

Signed and sealed this 28th day of November, A. D., 1911.

[SEAL.]

E. B. MOORE,
*Commissioner of Patents.*